W. J. SHERRY.
MOTOR LOCKING MECHANISM.
APPLICATION FILED NOV. 4, 1912.
1,107,855.
Patented Aug. 18, 1914.
2 SHEETS—SHEET 1.
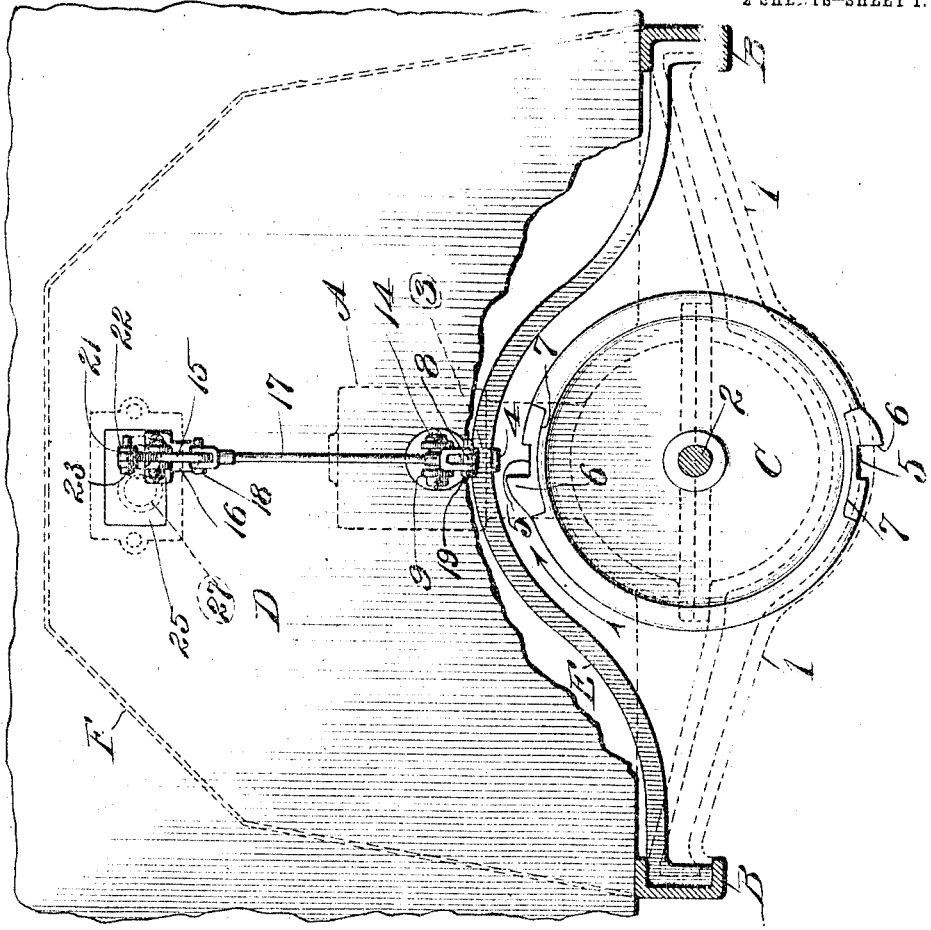
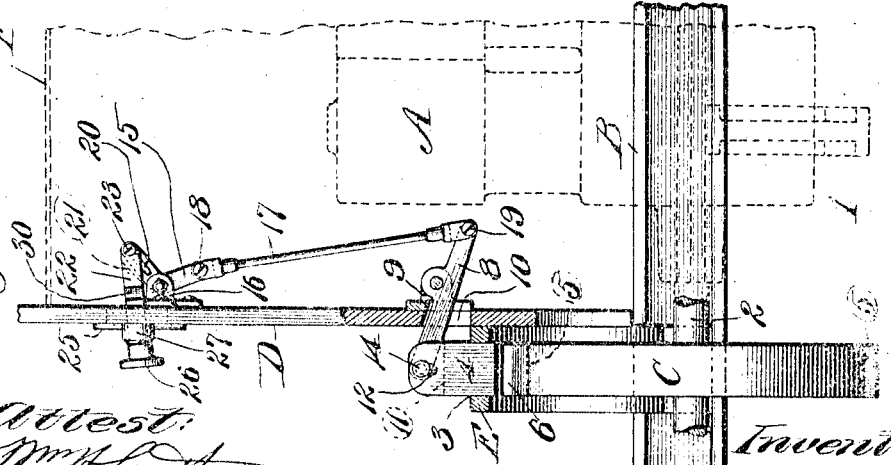
Inventor
Walter J. Sherry,
by Rippey & Kingsland, Atty's
Attest:
W. H. Scott
R. W. Lawrence

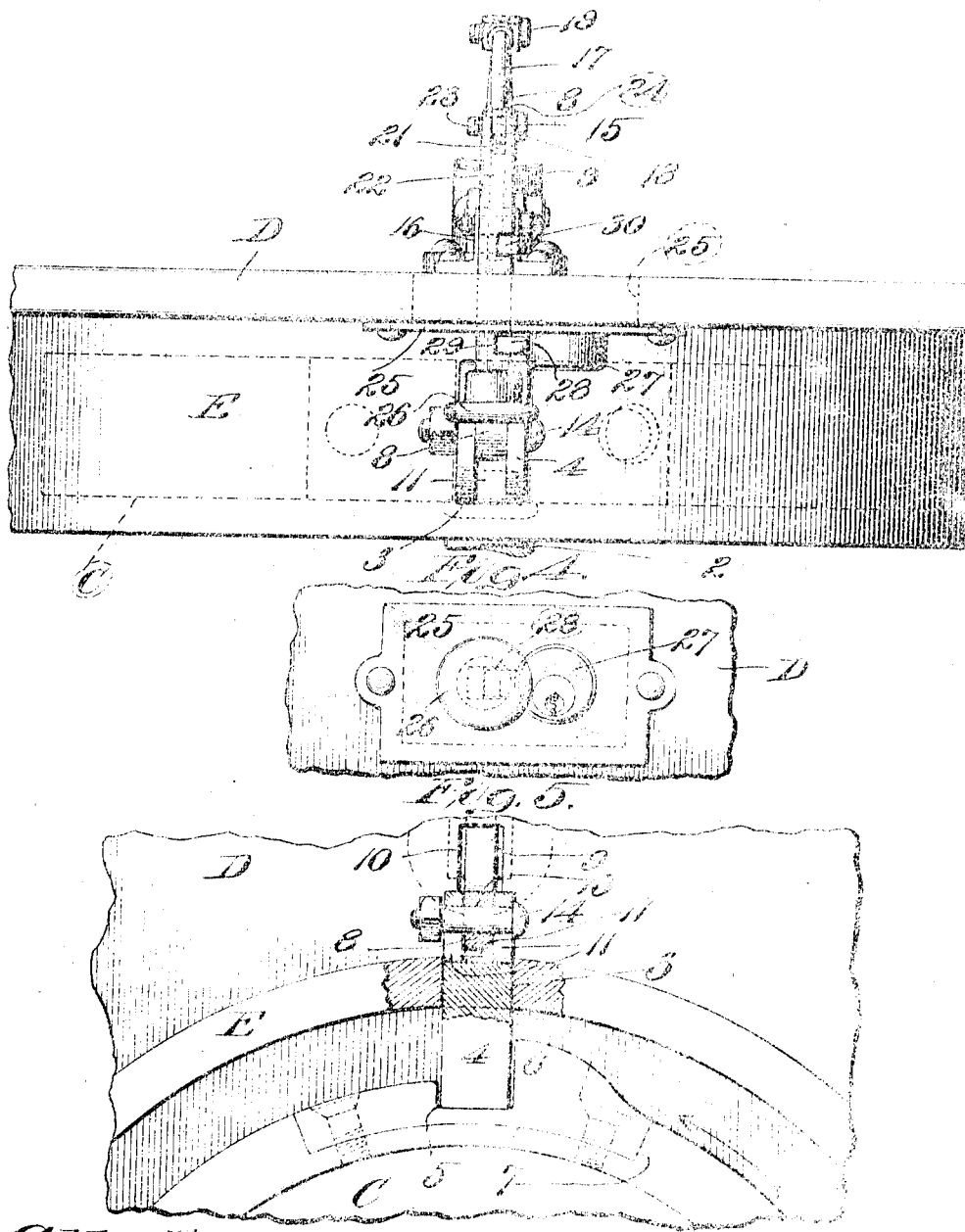

UNITED STATES PATENT OFFICE.

WALTER J. SHERRY, OF ST. LOUIS, MISSOURI.

MOTOR-LOCKING MECHANISM.

1,107,855.  Specification of Letters Patent.  Patented Aug. 18, 1914.

Application filed November 4, 1912. Serial No. 729,368.

*To all whom it may concern:*

Be it known that I, WALTER J. SHERRY, a citizen of the United States, residing in the city of St. Louis and State of Missouri, have invented a new and useful Motor-Locking Mechanism, of which the following is a specification.

This invention relates to locking mechanism for motors, and is particularly adapted for use as a lock for motor vehicle engines; and consists in the novel arrangement of parts hereinafter disclosed.

An object of the invention is to provide mechanism of the character mentioned which will be efficient to prevent the operation of a motor when set, and which may be conveniently and readily adjusted.

More specifically an object of the invention is to provide means for operating a lock bolt to seat the same in a keeper formed in the engine fly wheel, and also means to independently lock the lock bolt operating mechanism so that the lock bolt cannot be withdrawn until the independent lock is manually unlocked.

With these and other objects, which will be apparent without specific mention, in view, I have designed, combined and arranged the several coöperating parts or elements in the manner hereinafter described, reference being made, in the course of the description to the accompanying drawing, in which like characters of reference indicate like parts throughout the several views, and in which—

Figure 1 is a side view of the mechanism of the invention, partially in elevation and partially in section, showing an engine fly wheel mounted on the main driven shaft of an engine (shown in dotted line), and the lock bolt coöperating with a keeper formed in the periphery of the said wheel, and the operating mechanism for operating the lock bolt, which mechanism is supported by the vertical dash board of a motor vehicle. Fig. 2 is a view of the device, looking from the front of the vehicle rearward. Fig. 3 is a plan view of the mechanism. Fig. 4 is a detail view of key operated lock for locking the lock bolt operating mechanism, and Fig. 5 is a view showing the rear face of the fly wheel, the lock bolt seated, and a portion of the lock bolt operating mechanism.

I have for the purpose of illustration shown my invention embodied in a motor vehicle, the engine or motor of which is indicated by A; said engine being supported by yokes 1, carried by the frame or chassis B. The main driven shaft 2 of the engine A, extends rearwardly, and has fast thereon a fly wheel C, supported vertically, rearwardly of the dash board D below the vehicle body. A bridge or yoke E extends transversely of the frame B, and is positioned superjacent to the fly wheel C. The bridge or yoke E is provided with a rectangular slot 3 formed therein, and positioned at the top or apex thereof. A sliding bolt 4 is mounted in said slot 3, and is adapted to seat in notches 5 formed in the periphery of the fly wheel C, when it is dropped to its lowered position by the mechanism hereinafter described. At one side of each of the notches 5, is a projection or abutment 6. I have illustrated the notches 5 and the projection 6, formed in a block which is bolted in recesses 7 formed in the periphery of the wheel C, and diametrically positioned with respect to each other. It will of course be understood that the periphery of the wheel C may be so cast as to include integrally the said notches 5 and projections 6; but where my device is applied to structures which include the usual fly wheels with smooth peripheries, it will be obvious that the labor involved in adapting the wheels to coöperate with the lock bolt, will be lessened by utilizing the construction illustrated. The integral construction, however, would be preferable perhaps where the fly wheel C is constructed in the first instance with the application of the present mechanism in view, as such a construction would be stronger.

The mechanism for raising and lowering the lock bolt 4, comprises a lever 8, pivoted to a lug 9, supported on the front of the dash board D at about the floor line of the vehicle. One arm of the lever 8, extends rearwardly through a slot 10 in the dash board D. The inner end of the lever 8 projects into a recess 11 formed in the upper face of the lock bolt 4; the depth of the recess 11 being greater than the vertical dimension of the lever 8. In the walls of the recess 11 are enlongated slots 12; and lever 8 is provided with a hole 13 adjacent to its extremity. A bolt 14, passing through said slots and opening, constitutes a pivot connection between the said lever 8 and the lock bolt 4. A bell crank lever 15 is pivoted to a lug 16, supported by the front face of the dash board D, above the lug 9. A link 17 is pivoted at 18 to the lower arm of the lever 15, and to the forward end of the lever 8 at 19. The upper arm of the lever 15 is provided with an enlongated slot 20; and extends into a recess 21 formed in the outer end of a rod or plunger 22. A pin 23 passes through registering holes 24, in the walls of the recess 21, and through the elongated slot 20, thereby, constituting a pin and slot connection between the plunger 22, and the lever 15. The plunger 22 is arranged to slide in slots formed in the front and rear wall of the case 25; said slots being arranged so that the plunger will incline slightly upwardly. The plunger 22 has a knob or handle 26 on its inner end for manual engagement. At one side of the plunger 22, and mounted in the case 25, is a key controlled lock 27, provided with a bolt 28 which extends toward the plunger 22. The plunger 22 has notches 29 and 30 in the face thereof adjacent to lock 27. The lock 27 may be either of the spring or positively operated type.

From the foregoing description the operation of the mechanism will be understood to be as follows: By moving the plunger or rod 22 inwardly the lock bolt 4 is raised to a position above the upper face of the projections 6, and is locked in its raised position by the bolt 28 of the independent lock 27, seating in the notch 29. When the mechanism is in this adjustment the fly wheel C and, therefore, the shaft 2 of the engine is free to revolve. After the engine has been stopped, and it is desired to lock it, the bolt 28 of the lock 27, is moved out of the notch 29, and the plunger or rod 22 manually drawn outwardly, which drops the lock bolt 4. If the lock 27 is of the spring type, the bolt 28 thereof will automatically seat itself in the notch 30 in the plunger or rod 22, and will hold the lock bolt 4 down. In this position the lock bolt 4 rests against the periphery of the wheel C, and if the wheel C be turned in the direction of the arrow in an effort to crank the engine to start the operation thereof, the lock bolt 4 will abut against one of the projections 6, and drop into the adjacent notch 5, thereby locking the wheel C, preventing further operation thereof. Before the lock bolt 4 can be raised to release the wheel C, it is necessary to release the plunger or rod 22 by manipulation of the lock 27.

The hood F of the vehicle covers substantially all the operating mechanism, and by locking the hood, tampering with the connections from the outside may be prevented.

I am aware that numerous changes in the details of the construction may be made without departing from the spirit and scope of the invention and I do not limit myself, therefore, to exact details, but

What I claim and desire to secure by Letters Patent is:

1. In a motor vehicle, the combination with an engine having a main shaft and a member provided with keeper devices thereon, a bridge rigidly supported by the frame of the vehicle above said member, a lock bolt operating through an opening in said bridge, an arm supported above said bolt and being connected to said bolt, operating connections for raising and lowering said arm and a lock device for locking said connections, substantially as specified.

2. In a motor vehicle, the combination with an engine having a rearwardly extending shaft and a fly-wheel fast thereon arranged to revolve below the vehicle body, a lock bolt supported above said fly-wheel, keeper devices arranged in the periphery of said fly-wheel and adapted to coöperate with said lock bolt, an arm supported by the dashboard of the vehicle having pin and slot connection with said lock bolt, a bell crank lever supported above said arm, a link connecting one arm of the bell crank lever to said arm, and a plunger extending through the dashboard of the vehicle, and accessible from the driver's seat thereof, for operating said bell crank lever and thereby raising and lowering said lock bolt through the connections effectively to lock and unlock the said fly-wheel, substantially as specified.

3. In a motor vehicle, the combination with an engine having a main shaft, a member carried by said main shaft provided with keeper devices, a lock bolt supported above said main shaft, a rigid frame secured to the chassis of the vehicle adapted to coöperate with said bolt and said member to rigidly lock the shaft, an arm connected to said bolt, a lever for operating said arm, a handle connected to said lever and a lock mechanism for said handle, substantially as specified.

In witness whereof, I have signed this specification in the presence of two subscribing witnesses.

WALTER J. SHERRY.

Witnesses:
LOUIS YECKEL, Jr.,
L. C. KINGSLAND.